United States Patent [19]

Lorenzen

[11] Patent Number: 4,875,008

[45] Date of Patent: Oct. 17, 1989

[54] DEVICE FOR SENSING THE ANGULAR POSITION OF A SHAFT

[75] Inventor: David M. Lorenzen, Hamden, Conn.

[73] Assignee: North American Philips Corporation, New York, N.Y.

[21] Appl. No.: 156,101

[22] Filed: Feb. 16, 1988

[51] Int. Cl.[4] .......................... G01B 7/14; G01R 33/02; H03K 17/00; H01L 43/08
[52] U.S. Cl. ..................................... 324/208; 324/251; 338/32 R; 307/309
[58] Field of Search ............... 324/207, 208, 251, 252; 338/32 R, 32 H; 323/368; 307/309

[56] References Cited

U.S. PATENT DOCUMENTS

| | | | |
|---|---|---|---|
| 3,471,722 | 10/1969 | Hini | 338/32 R |
| 3,835,373 | 9/1974 | Matula | 324/208 |
| 4,053,829 | 10/1977 | Maruo | 324/252 |
| 4,204,158 | 5/1980 | Ricouard et al. | 324/208 |
| 4,481,469 | 11/1984 | Hauler et al. | 324/174 |
| 4,791,365 | 12/1988 | Johannes et al. | 324/208 |

Primary Examiner—Reinhard J. Eisenzopf
Assistant Examiner—Walter E. Snow

[57] ABSTRACT

Device for sensing angular position of a shaft utilizes a flat on the shaft, a permanent magnet with its polar axis perpendicular to the shaft axis, and a magneto-resistive element between the magnet and the flat. The resistance of the element varies linearly as the shaft is rotated from a first position to a second position.

12 Claims, 2 Drawing Sheets

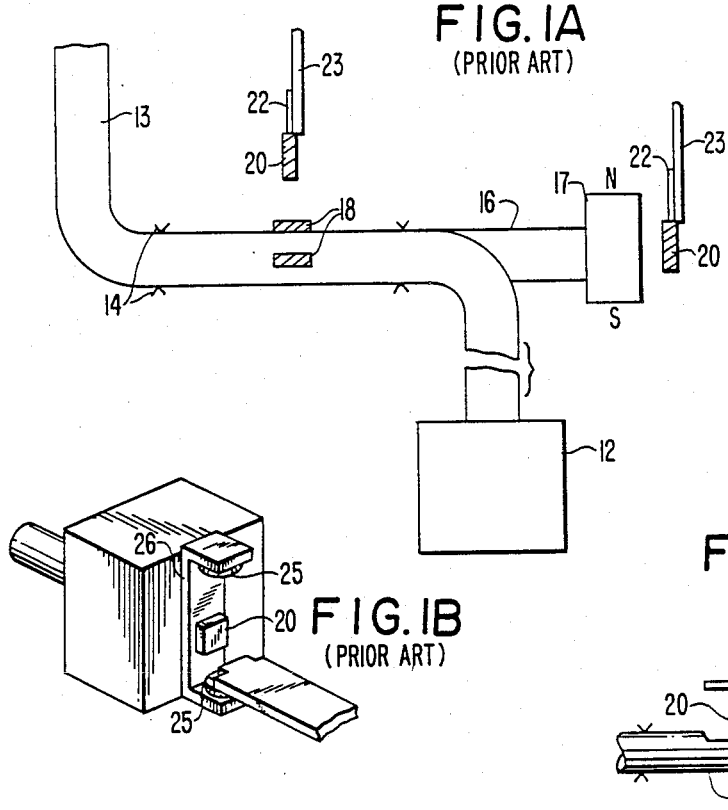
FIG. 1A (PRIOR ART)
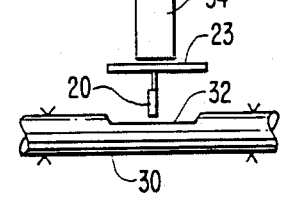
FIG. 1B (PRIOR ART)
FIG. 2
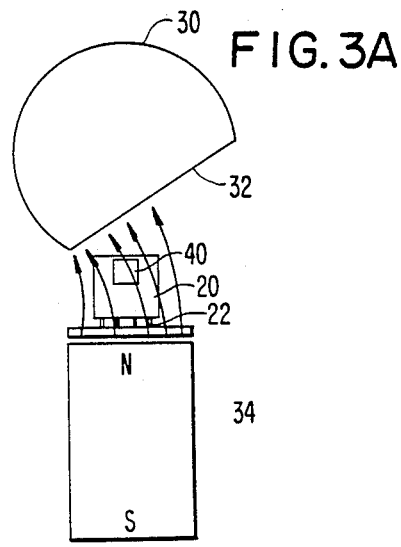
FIG. 3A
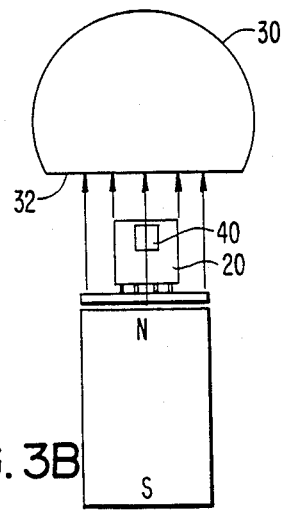
FIG. 3B

DEVICE FOR SENSING THE ANGULAR POSITION OF A SHAFT

BACKGROUND OF THE INVENTION

The present invention relates to a device which senses the degree of angular rotation of a shaft, and particularly to a device providing an output voltage linearly proportional to the degree of rotation.

Devices for detecting rotary speed of a toothed element such as a gear are well known. See, e.g., U.S. Pat. No. 4,481,469. Such a device utilizes a Hall cell sensor or a magneto-resistive (MR) sensor and a permanent magnet to generate a sinusoidal voltage based on the tengential component of the magnetic field as teeth pass the sensor. Each passing soft iron gear tooth causes a peak in the sinusoid which can readily be transparent to RPM; such a device is thus a digital speed measuring device. U.S. Pat. No. 4,086,533 discloses apparatus which utilizes a Hall cell sensor to determine the angular position of a rotating part, but only identifies discrete positions where a magnetic field component between two magnets shifts direction under the influence of rotating flux guides.

For some applications it is desirable to know the exact angular position of a shaft as it moves from a first angular position to a second angular position rather than measuring speed or discrete locations of the shaft. For example, a pedal position sensor in an automobile could determine throttle position from pedal shaft position without direct mechanical linkage. The relationship between the angular position of such a shaft and the output voltage of the sensing device should be linear.

One prior art solution to providing such a linear voltage output is to fix a magnet on the end of the shaft, as shown in FIG. 1A. Pedal shaft 10 is pivoted by pedal 12 against the action of a spring on the opposed lever 13, and thus rotates in bearings 14. The magnet 17 is mounted on a coaxial shaft extension 16 with its magnetic axis perpendicular to the shaft axis and parallel to the sensing substrate 20 so that flux lines pass substantially perpendicular to the plane of the substrate and the sensor thereon. The substrate 20 in turn is mounted to printed circuit board (PCB) 23 by leads 22. The substrate carries an MR sensing element comprising permalloy strips whose resistance changes in the presence of a changing external magnetic field therethrough. This could be described in rectangular coordinates by field components $H_x$ and $H_y$. In the initial pedal position $H_x$ could be zero, and would increase to maximum value when shaft 10 rotated ninety degrees, whereupon $H_y$ would be zero. FIG. 1B shows a similar arrangement using two magnets 25 on a frame 26. This arrangement and other uses of MR sensors is described in greater detail in *Philips Data Handbook,* Book S-13, pp. 4–19 (1986), which pages are hereby incorporated by reference.

FIG. 1A also depicts another prior art sensing arrangement wherein two magnets 18 are mounted directly on the shaft 10, with a sensing substrate 20 in a plane perpendicular to the axis of shaft 10. Such an arrangement will also provide a continuous voltage variation as the shaft rotates, which voltage variation will be substantially linear for rotations less than the angular separation of magnets 18.

The above arrangements require mounting magnets on the shaft whose rotation is to be measured, which from a manufacturing standpoint is not as expedient as mounting an integrated sensing device adjacent the shaft.

SUMMARY OF THE INVENTION

According to the invention, the shaft whose angular position is to be measured is provided with a sensing portion in the form of a flat parallel to the axis of the shaft. The magnetic field is provided by a permanent magnet with its axis perpendicular to the shaft axis, and the MR sensing element is situated adjacent to the flat between the permanent magnet and the shaft. It will be apparent that other symmetric geometries of the sensing portion besides a flat may be suitable for producing the desired variation in voltage output.

The MR sensing element is mounted on a substrate and is preferably of the type comprising four permalloy strips connected in a bridge arrangement and extending to four leads connected to a PCB between the sensor and the permanent magnet. Rotation of the shaft thus causes the effective shaft radius on either side of the centerline of the sensor to vary inversely, so that the reluctance and the sensed flux components $H_x$ and $H_y$ will also vary, causing the MRS bridge resistance to become imbalanced. With a supply voltage across the bridge, this imbalance produces a voltage output proportional to the angular shaft position.

An object of the invention is to provide an output voltage which varies linearly with angular position of the shaft. Since the voltage output of the MRS is zero when the $H_x$ component of the magnetic field is zero, the axis of the permanent magnet should be aligned with the minimum radius of the sensing portion, which is at the midpoint of the flat, when the shaft is midway between the first and second angular positions. If the angle between these positions is less than the angle subtended by the flat as seen in cross section, the voltage output of the sensor will vary substantially linearly from negative to positive values as the shaft rotates. It is then a simple matter to provide an adder in the circuitry so that the output is zero volts in the first angular position. In addition to the angle subtended by the flat as compared to overall rotation, the degree of linearity is also affected by the size of the air gap between the sensor and the flat.

BRIEF DESCRIPTION OF THE DRAWINGS

FIG. 1A is a schematic plan view of two prior art arrangements for detecting angular position of a pedal shaft, FIG. 1B is a plan view of a third prior art arrangement, FIG. 2 is a partial plan view of the inventive position sensing arrangement, FIG. 3A is a section view of the shaft and sensing device in the first position, FIG. 3B is a section view of the shaft and the sensing device in the midway portion.

DETAILED DESCRIPTION OF THE PREFERRED EMBODIMENT

Figure 4:
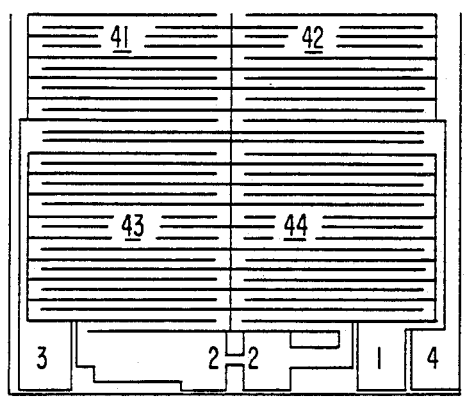
FIG. 4 is a plan view of the MR sensing chip.

Referring to FIG. 2, the invention resides in the combination of a shaft 30 having a flat 32 which can be readily machined in a cylindrical surface thereof parallel to the axis of the shaft. This forms the sensing portion of the shaft 30. The sensing substrate 20 may be the same as the substrate used in prior art schemes discussed above, and is suitably employs an AMPEREX model KMZ10 chip as the MR sensing element. the substrate 20 has leads 22 connecting it to a PCB 23 which in turn is connected to the voltage source and output. A magnetic field is provided by permanent magnet 34, which is fixedly mounted with respect to the sensing substrate 20 and PCB 23.

Referring to FIG. 3A, the substrate 20 carries an MR sensing element 40 in a plane perpendicular to the axis of the shaft, so that the horizontal component $H_x$ of the magnetic field will produce a voltage output across two of the leads 22. In the initial position shown, the flux is bent to its maximum extent due to the proximity of the maximum radius of the sensing portion. As the shaft turns clockwise to the midway position shown in FIG. 3B, the voltage will decrease correspondingly with $H_x$, becoming zero at the position shown. An additional clockwise rotation through a like angle will yield a voltage of the like magnitude but opposite polarity as the position of FIG. 3A.

Figure 6:
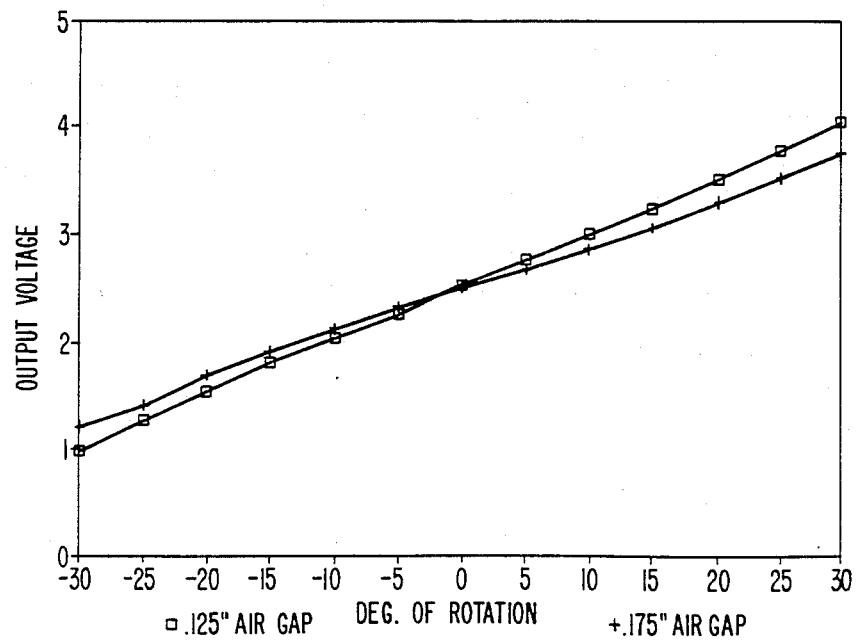
FIG. 6 is a plot of the output voltage versus rotation over sixty degrees.

Actual voltage measurements versus degrees of rotation for two different air gaps are shown in FIG. 6; note that the plots achieve the desired linearity between voltage and rotation. The output voltage has been modified by a voltage adder in the circuitry of the PCB to yield positive values which are readily translated to shaft position. Amplifier means have also been provided in the circuitry to change the slope of the plots.

Figure 5:
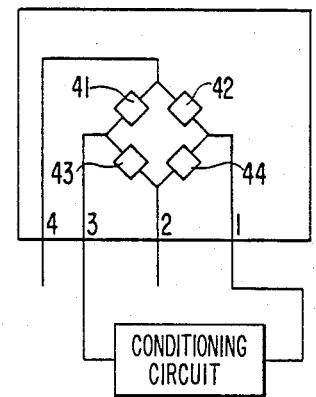
FIG. 5 is a schematic of the bridge circuit.

FIG. 4 shows the sensing element 40 in greater detail. Salient features include the four permalloy strips 41, 42, 43, 44 which are connected to form the four arms of a Wheatstone bridge as shown in FIG. 5. Leads 2 and 4 are connected to the supply voltage while leads 1 and 3 are the output voltage leads and are connected to a conditioning circuit consisting of adders, amplifiers and temperature compensation devices. The system described uses a PCB having a conditioning circuit, which could also be combined into an integrated package with the MRS.

What is claimed is:

1. The combination of a shaft rotatable about a central axis between first and second angular positions and a device for sensing the angular position of said shaft, said combination comprising:
    a magnet arranged with its polar axis perpendicular to the axis of said shaft for creating a magnetic field between said magnet and said shaft;
    a sensing portion extending over a distance on said shaft for changing the direction of said magnetic field as said shaft is rotated between said first and second angular positions; said sensing portion having a cross section exhibiting a minimum radius and symmetrically increasing radius on either side of said minimum radius;
    a directionally responsive sensing element situated in said directionally changing magnetic field between said shaft and said magnet, said element being substantially perpendicular to said axis of said shaft, said element producing thereacross a resistance which varies at least substantially linearly as a function of the direction of the field as said shaft is rotated from said first position to said second position.

2. The combination of claim 1 wherein said sensing portion of said shaft has a planar surface parallel to said axis, said planar surface appearing as a chord in said cross section, said minimum radius meeting said chord at the midpoint thereof.

3. The combination of claim 1 wherein said magnetic axis of said magnet is aligned with said minimum radius of said sensing portions when said shaft is in said first angular position.

4. The combination of claim 1 wherein said magnetic axis of said magnet is aligned with said minimum radius of said sensing portion when said shaft is midway between said first angular position and said second angular position.

5. The combination of claim 4 wherein said sensing element comprises four strips of ferromagnetic alloy whose resistance changes with the angle between an applied magnetic field and the direction of the current through the sensor, said strips being connected to form the four respective arms of a Wheatstone bridge.

6. The combination of claim 5 wherein said Wheatstone bridge is in a balanced condition when said shaft is midway between said first and second angular positions, said device further comprising amplifier means which adjusts said voltage to zero when said shaft is in said first angular position.

7. The combination of claim 5 wherein said Wheatstone bridge is in a balanced condition when said shaft is in said first angular position.

8. The combination of claim 1 wherein said shaft undergoes an angular rotation of less than ninety degrees as it is rotated from said first angular position to said second angular position.

9. The combination of a shaft rotatable about a central axis between first and second angular positions and a device for sensing the angular position of said shaft, said combination comprising:
    a magnet arranged with its polar axis perpendicular to the axis of said shaft for creating a magnetic field between said magnet and said shaft;
    a sensing portion on said shaft for changing the direction of said magnetic field as the shaft is rotated between said first and second angular positions;
    a directionally responsive substantially planar magneto-resistive element situated adjacent to said sensing portion in said directionally changing magnetic field between said shaft and said magnet, said element being substantially perpendicular to said axis of said shaft, said element producing thereacross a resistance which varies at least substantially linearly as a function of the direction of the field as said shaft is rotated from said first position to said second position;
    wherein said sensing element comprises four strips of ferro magnetic alloy whose resistance changes with the angle between applied magnetic field and the direction of a current through said sensor, said strips being connected to form four respective arms of a Wheatstone bridge which is in a balanced condition when said shaft is midway between said first and second angular position; and
    means connected to an output of said Wheatstone bridge which adjust a voltage at said output to zero when said shaft is in said first angular position.

10. The combination of claim 9 wherein said sensing portion of said shaft has a planar surface parallel to said axis, said planar surface appearing as a chord in said cross section, a minimum radius of said shaft meeting said chord at the midpoint thereof.

11. The combination of claim 9 wherein said magnetic axis of said magnet is aligned with a minimum radius of said sensing portions when said shaft is in said first angular position.

12. The combination of claim 9 wherein said magnetic axis of said magnet is aligned with a minimum radius of said sensing portion when said shaft is midway between said first angular position and said second angular position.

* * * * *